United States Patent
Seo et al.

(10) Patent No.: US 9,519,576 B2
(45) Date of Patent: Dec. 13, 2016

(54) MEMORY CONTROLLER, METHOD OF OPERATING THE SAME AND MEMORY SYSTEM INCLUDING THE SAME

(71) Applicant: SAMSUNG ELECTRONICS CO., LTD., Suwon-Si, Gyeonggi-Do (KR)

(72) Inventors: Youngil Seo, Gyeonggi-do (KR); Jungho Yun, Seoul (KR); Wonchul Lee, Gyeonggi-do (KR); Dawoon Jung, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 467 days.

(21) Appl. No.: 14/081,371

(22) Filed: Nov. 15, 2013

(65) Prior Publication Data
US 2014/0237165 A1 Aug. 21, 2014

(30) Foreign Application Priority Data

Feb. 19, 2013 (KR) .................. 10-2013-0017626

(51) Int. Cl.
*G11C 11/00* (2006.01)
*G06F 12/02* (2006.01)
*G06F 11/00* (2006.01)

(52) U.S. Cl.
CPC ... *G06F 12/0246* (2013.01); *G06F 2212/1032* (2013.01); *G06F 2212/7205* (2013.01)

(58) Field of Classification Search
CPC .................................. G11C 11/00; G06F 11/00
USPC .............................. 714/764–768; 365/185.11
See application file for complete search history.

(56) References Cited

U.S. PATENT DOCUMENTS

| 8,072,805 B2 | 12/2011 | Chou et al. |
| 8,130,544 B2 | 3/2012 | Chou et al. |
| 8,422,291 B2 | 4/2013 | Kim et al. |
| 2006/0095829 A1* | 5/2006 | Muranushi ............ G11O 5/141 714/766 |
| 2010/0208521 A1* | 8/2010 | Kim ....................... G11C 16/26 365/185.09 |
| 2010/0235713 A1* | 9/2010 | Lee ..................... G06F 11/1072 714/763 |
| 2012/0096217 A1 | 4/2012 | Son et al. |
| 2012/0106247 A1 | 5/2012 | Shin |
| 2014/0063955 A1* | 3/2014 | Kawase ............. G06F 11/1048 365/185.12 |

FOREIGN PATENT DOCUMENTS

JP 2010509700 3/2010

* cited by examiner

*Primary Examiner* — Christopher Shin
(74) *Attorney, Agent, or Firm* — F. Chau & Associates, LLC (57) ABSTRACT

A memory controller controlling a nonvolatile memory device having a plurality of memory blocks as a data storage space includes an error detection and correction circuit and a reclaim control unit. The error detection and correction circuit receives data from a memory block and calculates a comparison result by comparing a bit error rate of the received data and a predetermined value. The reclaim control unit determines whether or not to perform a read reclaim operation depending on the comparison result and a read voltage used to read the data. The read reclaim operation copies the data to a memory block different from a memory block having stored the data.

19 Claims, 10 Drawing Sheets

MEMORY CONTROLLER, METHOD OF OPERATING THE SAME AND MEMORY SYSTEM INCLUDING THE SAME

CROSS-REFERENCE TO RELATED APPLICATION

This application claims priority under 35 U.S.C. §119 of Korean Patent Application No. 10-2013-0017626, filed on Feb. 19, 2013 in the Korean Intellectual Property Office, the disclosure of which is incorporated by reference herein in its entirety.

TECHNICAL FIELD

The present inventive concept relates to a memory controller, a method of operating the same and a memory system including the same.

DISCUSSION OF RELATED ART

Semiconductor memory devices are classified into a volatile semiconductor memory device and a nonvolatile semiconductor memory device. A volatile semiconductor memory device operates fast but loses its stored data when an external power supply is not supplied. A nonvolatile semiconductor memory device retains its stored data without an external power supply. A NAND-type flash memory device is widely used for a nonvolatile semiconductor memory device. A NAND-type flash memory device reliably operates up to a certain number of program/erase operations. Repeated program/erase operations degrade the quality of oxide layers for memory cells. This degradation may be referred as a wear out.

SUMMARY

According to an exemplary embodiment of the inventive concept, a memory controller controlling a nonvolatile memory device having a plurality of memory blocks as a data storage space includes an error detection and correction circuit and a reclaim control unit. The error detection and correction circuit receives data from a memory block and calculates a comparison result by comparing a bit error rate of the received data and a predetermined value. The reclaim control unit determines whether or not to perform a read reclaim operation depending on the comparison result and a read voltage used to read the data. The read reclaim operation copies the data to a memory block different from a memory block having stored the data.

According to an exemplary embodiment of the inventive concept, an operation method of a memory controller controlling a nonvolatile memory device having a plurality of memory blocks is provided. A read operation is performed on a memory block using a first read voltage. A bit error rate of data that is received from the memory block is calculated. The calculated error rate is compared to a predetermined value. If the bit error rate is determined as not being less than the predetermined value, the memory controller determines whether the first read voltage is within a reclaim prohibition range. The memory controller determines whether or not performing a read reclaim operation of copying the data to a memory block different from the memory block having stored the data, depending on whether the first read voltage is within the reclaim prohibition range.

According to an exemplary embodiment of the inventive concept, a memory system includes a nonvolatile memory device and a memory controller. The nonvolatile memory device includes a plurality of memory blocks as a data storage space. The memory controller performs a read operation using a read voltage on one of the plurality of the memory blocks, calculates a bit error rate of data received from nonvolatile memory device, calculates a comparison result by comparing the bit error rate and a predetermined value, wherein the predetermined value is equal to or less than a number of errors to be corrected by the memory controller using an error correction algorithm, and determines whether or not to perform a read reclaim operation based on the read voltage and the comparison result, wherein the read reclaim operation copies the data to a memory block different from a memory block having stored the data depending on the read voltage.

BRIEF DESCRIPTION OF THE FIGURES

These and other features of the inventive concept will become more apparent by describing in detail exemplary embodiments thereof with reference to the accompanying drawings of which.

DETAILED DESCRIPTION OF THE EMBODIMENTS

Exemplary embodiments of the inventive concept will be described below in detail with reference to the accompanying drawings. However, the inventive concept may be embodied in different forms and should not be construed as limited to the embodiments set forth herein. It will be understood that when an element is referred to as being "coupled to" another element, it may be directly coupled to another element, or intervening elements may also be present. Like reference numerals may refer to the like elements throughout the specification and drawings.

Figure 1:
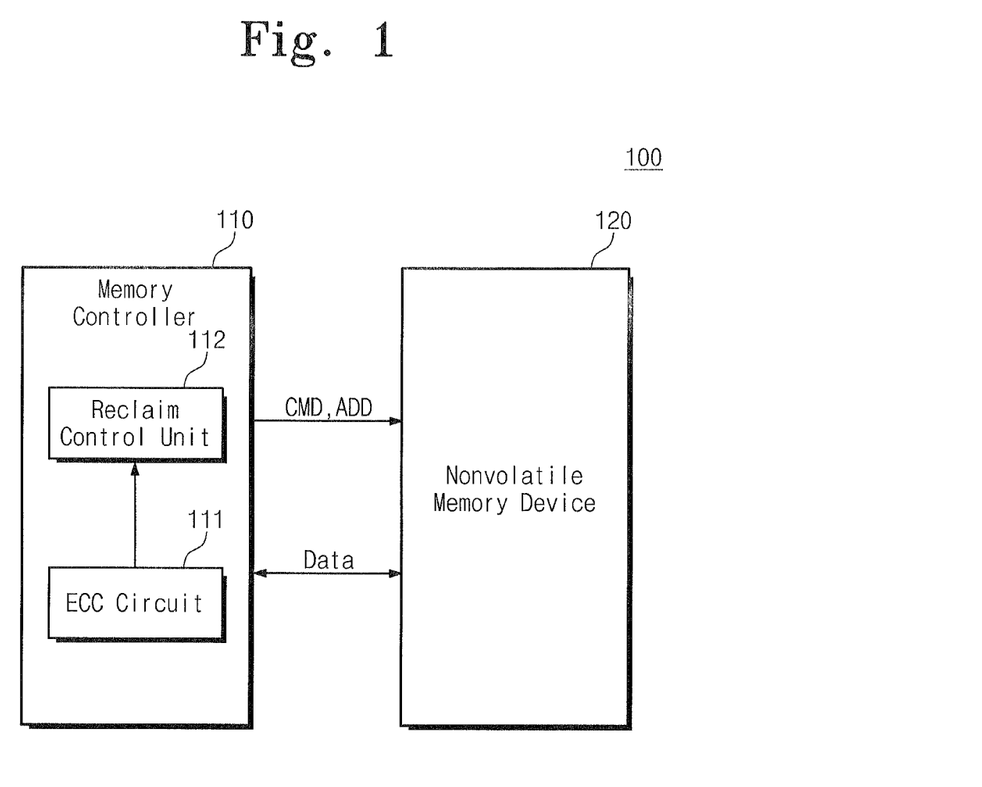
FIG. 1 is a block diagram illustrating a memory system in accordance with an exemplary embodiment of the inventive concept.

FIG. 1 is a block diagram illustrating a memory system in accordance with an exemplary embodiment of the inventive concept.

Referring to FIG. 1, the memory system 100 includes a memory controller 110 and a nonvolatile memory device 120.

For convenience of description, it is assumed that the nonvolatile memory device 120 is a NAND type flash memory device. However, the nonvolatile memory device 120 is not limited to a NAND type flash memory device. The nonvolatile memory device 120 may be a NOR type flash memory device, a resistive random access memory (RRAM), a phase change RAM (PRAM), a magnetic RAM (MRAM), or a ferroelectric RAM (FRAM).

The memory controller 110 is connected to a host (not illustrated) and the nonvolatile memory device 120. The memory controller 110 serves as an interface between the nonvolatile memory device 120 and the host. The memory controller 110 is configured to control the nonvolatile memory device 120. For example, the memory controller 110 may run a firmware for operating the nonvolatile memory device 1290. The memory controller 110 provides a control signal CMD and an address ADD to the nonvolatile memory device 120. The memory controller 110 exchanges data with the nonvolatile memory device 120.

The memory controller 110 accesses the nonvolatile memory device 120 in response to a request from the host. The memory controller 110 controls read, write, erase and background operations of the nonvolatile memory device 120. The background operation includes a read reclaim operation.

For a read operation, the memory controller 110 transmits a read control signal and an address to the nonvolatile memory device 120. In response to the read control signal, data is outputted from the nonvolatile memory device 120 to the memory controller 110. The read operation is performed using a read voltage having a predetermined level.

The memory controller 110 includes an error detection and correction circuit (ECC) 111 and a reclaim control unit 112.

The error detection and correction circuit (ECC) 111 detects an error of data read from the nonvolatile memory device 120 using an error correction code (ECC) and corrects the detected error. The error detection and correction circuit (ECC) 111 calculates a bit error rate (BER) of the read data and compares the calculated bit error rate (BER) with a threshold value. The error detection and correction circuit (ECC) 111 transmits a comparison result of the calculated bit error rate and the threshold value to the reclaim control unit 112.

The error detection and correction circuit (ECC) 111 may be embodied to decode data by an error correction code. The error detection and correction circuit (ECC) 111 may be embodied by various code decoders such as a decoder performing a nonsystematic code decoding or a decoder performing a systematic code decoding.

The reclaim control unit 112 determines whether a read voltage is within a reclaim prohibition range or not. The read voltage refers to a voltage used in the nonvolatile memory device 120 to read data received to the error detection and correction circuit (ECC) 111.

The reclaim control unit 112 performs a read reclaim operation on the nonvolatile memory device 120 only when a read voltage is not within the prohibition range. The read reclaim operation refers to an operation of copying data stored in any one of memory blocks of the nonvolatile memory device 120 to another memory block.

The reclaim control unit 112 receives a comparison result of a bit error rate and a threshold value from the error detection and correction circuit (ECC) 111. The reclaim control unit 112 performs a read reclaim operation on the nonvolatile memory device 120 when the calculated bit error rate is greater than a threshold value. However, if a read voltage is within the reclaim prohibition range, the reclaim control unit 112 does not perform a read reclaim operation on the nonvolatile memory device 120 even when the calculated bit error rate is greater than a threshold value.

As described above, the memory controller 110 performs a read reclaim operation on the nonvolatile memory device 120 only when a read voltage is not within the reclaim prohibition range. Thus, the number of times that the read reclaim operation of the nonvolatile memory device 120 is performed is reduced thereby improving the lifetime of the nonvolatile memory device 120. This is because the read reclaim operation of the nonvolatile memory device 120 increases a wear acceleration index (WAI).

The memory controller 110 may further include a random access memory (RAM), a processing unit, a host interface or a memory interface. The RAM may serve as an operation memory of the processing unit. For example, the RAM may serve as a cache memory between the nonvolatile memory device 120 and the host. The RAM may also serve as a buffer memory between the nonvolatile memory device 120 and the host. The processing unit may control an overall operation of the memory controller 110.

The host interface may perform data exchange between the host and the memory controller 110 using various protocols including, but are not limited to, a universal serial bus (USB) protocol, a multimedia card (MMC) interface protocol, a peripheral component interconnection (PCI) protocol, a PCI-E (PCI-express) protocol, an advanced technology attachment (ATA) protocol, a serial ATA protocol, a parallel ATA protocol, a small computer system interface (SCSI) protocol, an enhanced small disk interface (ESDI) protocol or an integrated drive electronics (IDE) protocol.

The memory interface interfaces with the nonvolatile memory device 120. The memory interface may include a NAND interface or a NOR interface.

Figure 2:
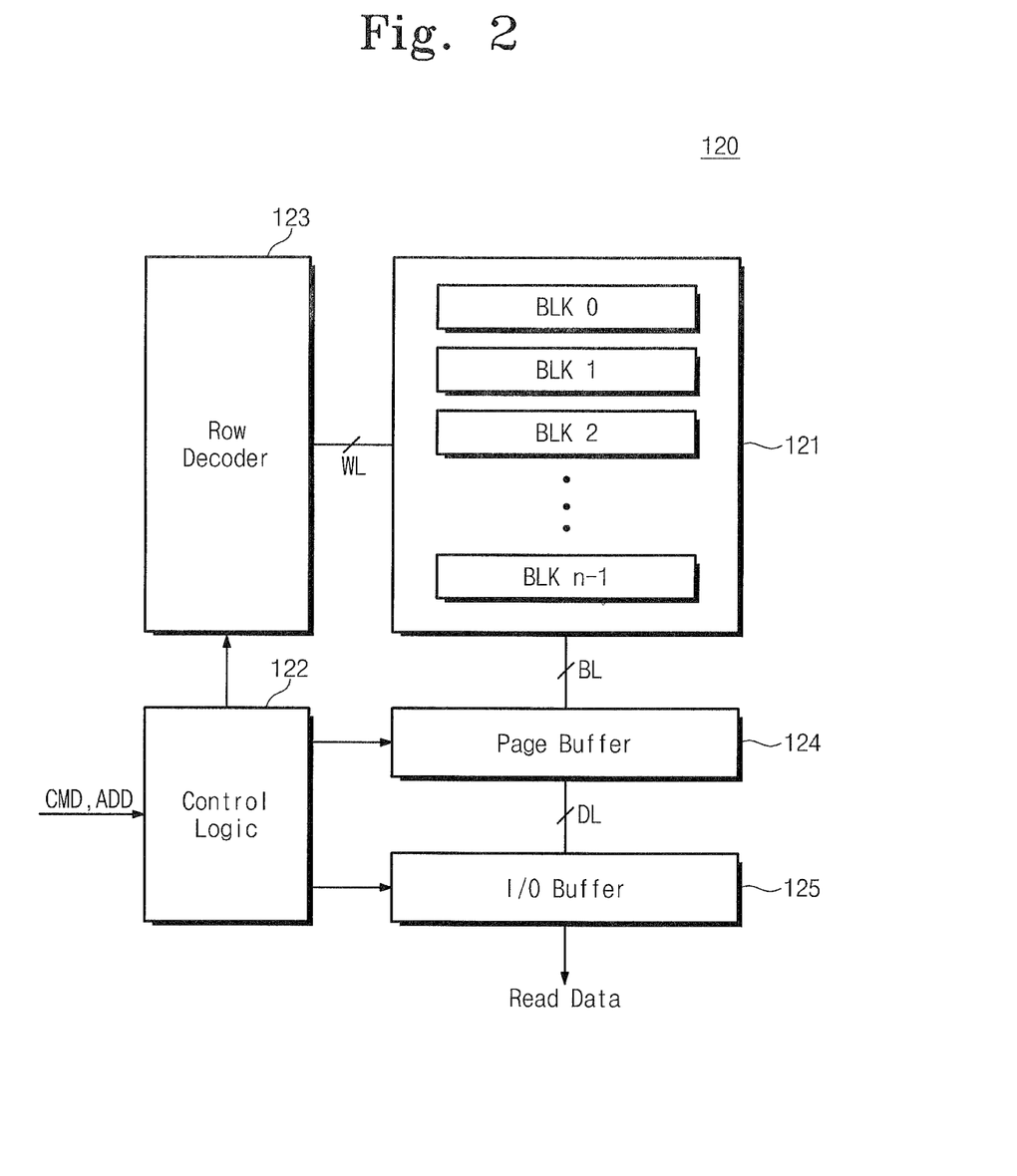
FIG. 2 is a block diagram illustrating a nonvolatile memory device of FIG. 1.

FIG. 2 is a detailed block diagram illustrating the nonvolatile memory device of FIG. 1 in accordance with an exemplary embodiment of the inventive concept.

Referring to FIG. 2, the nonvolatile memory device 120 includes a memory cell array 121, control logic 122, a row decoder 123, a page buffer 124 and an input/output buffer 125.

The memory cell array 121 includes a plurality of memory blocks BLK0~BLKn−1. Each of the memory blocks BLK0~BLKn−1 includes a plurality of pages. Each page includes a plurality of memory cells. Each memory cell is disposed in an area at which a word line WL and a bit line BL cross each other.

The control logic 122 controls the operation of the nonvolatile memory device 120. The control logic 122 may include a high voltage generator. The control logic 122 may generate high voltages needed to perform program, read and erase operations in response to a control signal CMD from the memory controller 110 of FIG. 1. When a read operation is performed, the control logic 122 may apply a read voltage Vrd and a read path voltage Vread to the memory cell array 121 using the row decoder 123. The control logic 122 transmits an address ADD being transmitted from the memory controller 110 to the row decoder 123 and the page buffer 124.

The page buffer 124 operates as a write driver or a sense amplifier depending on an operation mode. The page buffer 124 operates as a sense amplifier when a read operation is performed. The page buffer 124 receives data of one page unit from the memory cell array 121 when a read operation is performed. The page buffer 124 receives from the least significant bit (LSB) page to the most significant bit (MSB) page or receives from MSB page to LSB page corresponding to a page address from the memory cell array 121.

The input/output buffer 125 is configured to exchange data with the outside. Data being received from the outside is transmitted to the page buffer 124 through data lines DL. Data being transmitted from the page buffer 124 is output to the outside (e.g., memory controller). The input/output buffer 125 may include a data buffer.

Figure 3:
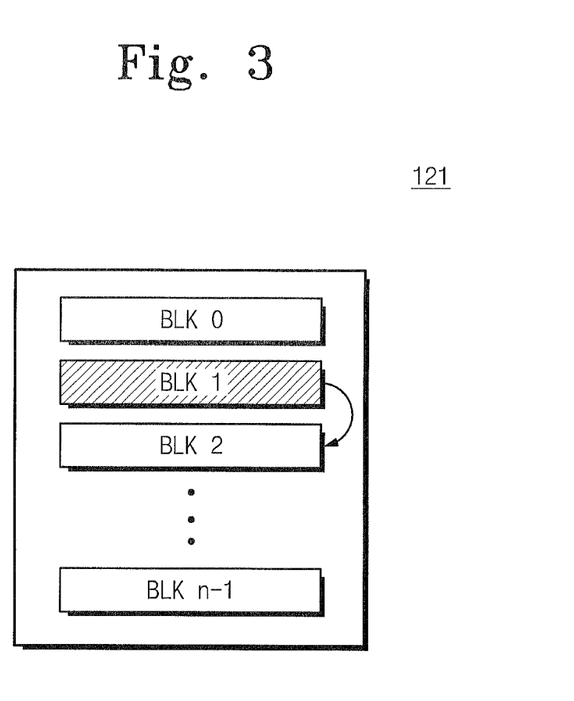
FIG. 3 is a drawing illustrating a read reclaiming operation according to an exemplary embodiment of the inventive concept.

FIG. 3 is a drawing illustrating a read reclaiming operation according to an exemplary embodiment of the inventive concept.

Referring to FIGS. 1 through 3, the nonvolatile memory device 120 reads data corresponding to an address from the memory cell array 121 and transmits the read data to the memory controller 110 according to a control of the memory controller 110.

The memory cell array 121 includes a plurality of memory blocks BLK0~BLKn−1. It is assumed that data corresponding to an address is stored in the memory block BLK1. The memory controller 110 copies data stored in the memory block BLK1 to another memory block (e.g., BLK2) when a read reclaim operation is performed. The read reclaim operation is performed to preserve data.

Since the read reclaim operation is one of background operations of the nonvolatile memory device 120, the nonvolatile memory device 120 may perform the read reclaim operation using idle time.

Figure 4:
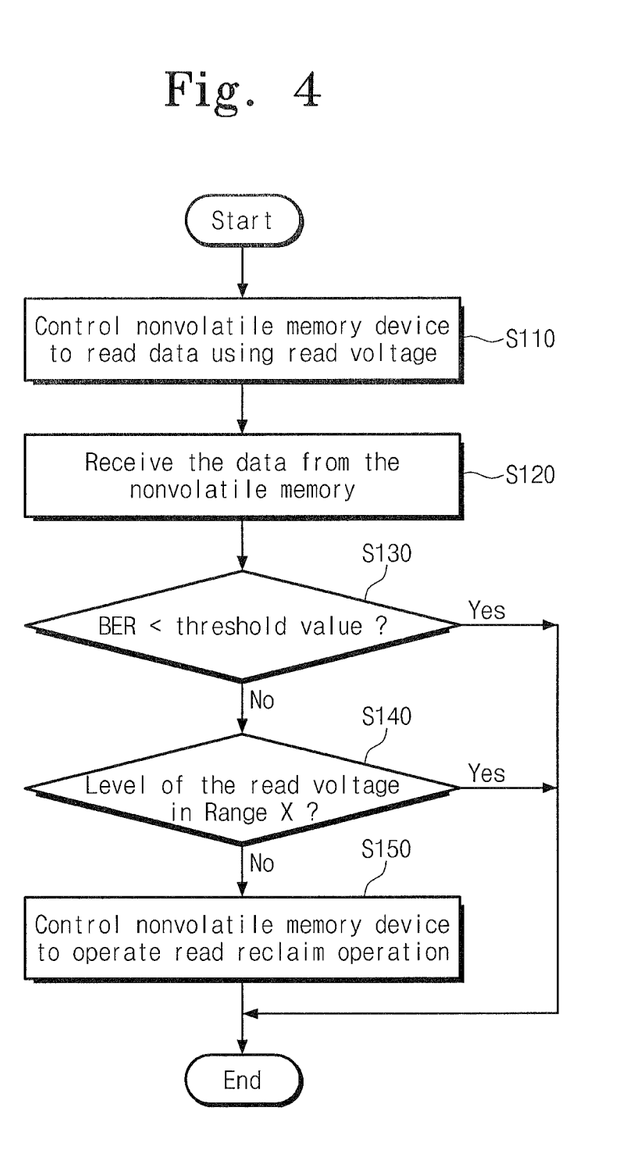
FIG. 4 is a flow chart illustrating an operation of a memory controller of FIG. 1 according to an exemplary embodiment of the inventive concept.

FIG. 4 is a flow chart illustrating an operation of a memory controller illustrated in FIG. 1 according to an exemplary embodiment of the inventive concept.

Referring to FIG. 4, the memory controller in accordance with an exemplary embodiment of the inventive concept performs a step S110 of controlling a nonvolatile memory device to read data using a read voltage, a step S120 of receiving the read data from the nonvolatile memory device, a step S130 of comparing a bit error rate (BER) of the read data with a predetermined value, a step S140 of judging whether the read voltage is within a reclaim prohibition range, and a step S150 of controlling the nonvolatile memory device to perform a read reclaim operation.

In the step S110, the memory controller 110 performs a read operation on the nonvolatile memory device 120. The memory controller 110 generates a control signal CMD and an address ADD. The memory controller 110 also transmits the control signal CMD and the address ADD to the nonvolatile memory device 120. For example, the memory controller 110 reads data corresponding to the address ADD from the nonvolatile memory device 120 using a read voltage having a predetermined level.

In the step S120, the memory controller 110 receives the data read from the nonvolatile memory device 120. The error detection and correction circuit 111 receives the data from the nonvolatile memory device 120.

In the step S130, the error detection and correction circuit 111 calculates a bit error rate (BER) of the received data. The error detection and correction circuit 111 compares the calculated bit error rate (BER) with a predetermined value and transmits a comparison result to the reclaim control unit 112.

If the calculated bit error rate is smaller than the predetermined value, the reclaim control unit 112 does not perform a read reclaim operation on the nonvolatile memory device 120. If the bit error rate is greater than the threshold value, the memory controller proceeds to the step S140.

In the step S140, the reclaim control unit 112 determines whether the read voltage level is within the reclaim prohibition range.

If the read voltage is within the reclaim prohibition range, the reclaim control unit 112 does not perform a read reclaim operation on the nonvolatile memory device 120. If the read voltage is not within the reclaim prohibition range, the reclaim control unit 112 performs a read reclaim operation on the nonvolatile memory device 120.

As described above, the memory controller 110 performs the read reclaim operation on the nonvolatile memory device 110 only when the read voltage is not within the reclaim prohibition range. Thus, the number of times that the read reclaim operation of the nonvolatile memory device 120 is performed is reduced thereby improving the lifetime of the nonvolatile memory device 120. This is because the read reclaim operation of the nonvolatile memory device 120 increases a wear acceleration index (WAI).

Figure 5:
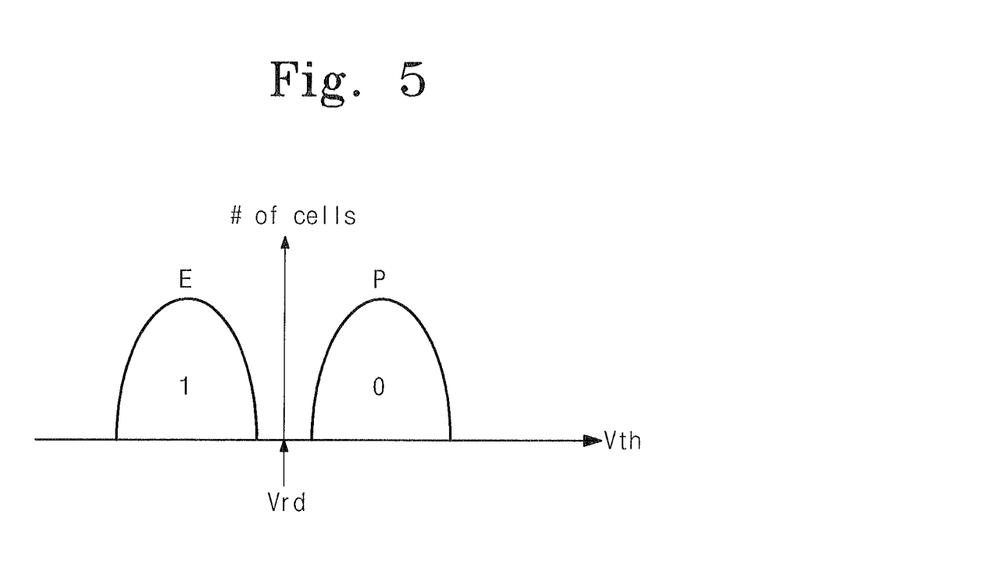
FIGS. 5 and 6 are distributions illustrating a threshold voltage distribution of a single-level cell flash memory and a cell distribution of a multi-level cell flash memory respectively.
Figure 6:
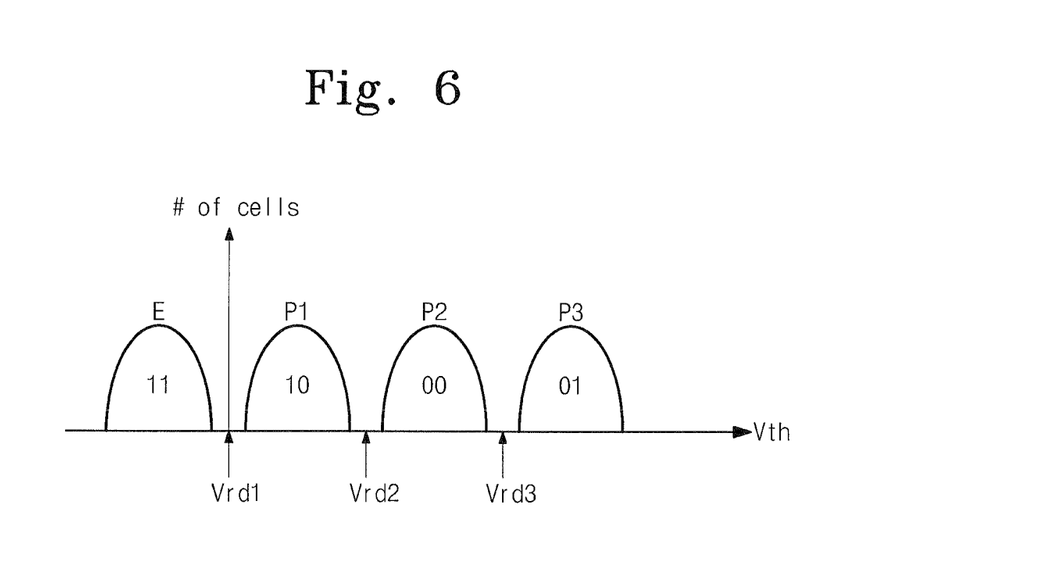
Figure 7:
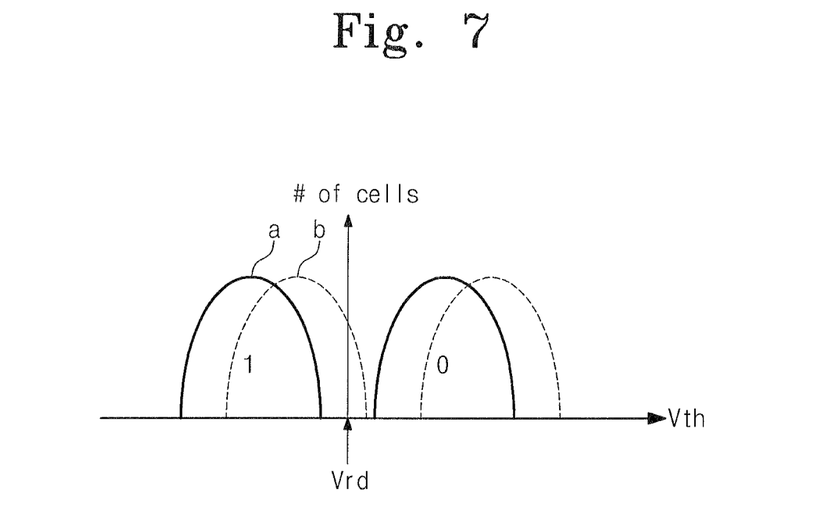
FIGS. 7 and 8 are distribution illustrating a change of the cell distribution of FIG. 5 and a change of the cell distribution of FIG. 6 respectively.
Figure 8:
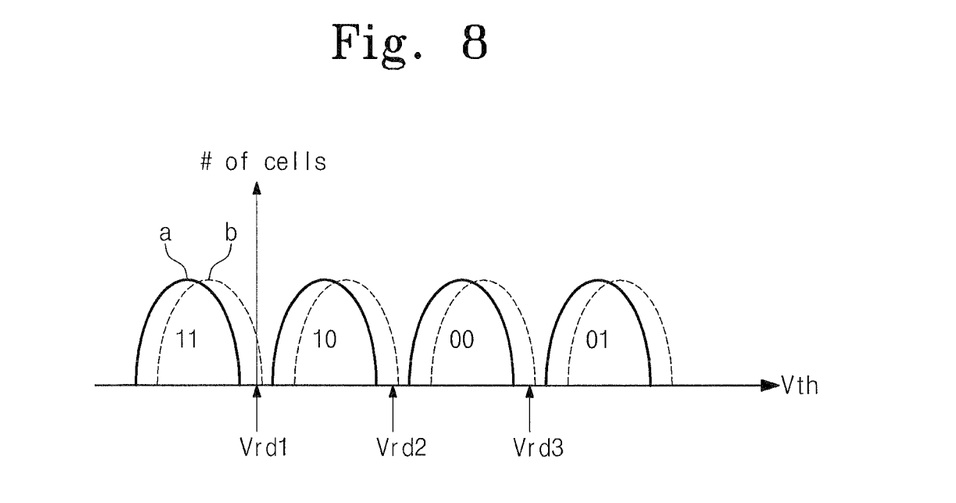

FIGS. 5 and 6 illustrate a cell distribution of a single-level cell flash memory and a cell distribution of a multi-level cell flash memory respectively. FIGS. 7 and 8 illustrate a change of the cell distribution of FIG. 5 and a change of the cell distribution of FIG. 6 respectively.

Referring to FIGS. 5 and 6, a distribution of threshold voltages of cells is shown. For SLC, a single read voltage is used to read one of two possible logic states of the cells. For MLC, three read voltages are used to read one of four possible logic states of the cells.

In case of the SLC, each cell has one of the two possible logic states including an erase state E and a program state P. In a read operation, the logic states of the cells are determined using a read voltage Vrd. In case of the MLC, each cell has one of the four possible states, including, for example, an erase state E and program states P1, P2 and P3. In a read operation, the logic state of the cell is determined using three read voltages Vrd1, Vrd2 and Vrd3.

However, as a program or erase operation is repeatedly performed on memory cells, the cell distribution is shifted. Referring to FIGS. 7 and 8, the cell distribution is shifted to have a higher Vth distribution (dotted line) to the extent that some of the erased cells having a logic state "1" have their threshold voltage (Vth) around or higher the read voltage Vrd that is previously set. When the erased cells are read using the read voltage Vrd, the read operation is determined as failed. As a result, a bit error rate increases. That problem may more seriously occur in a multi level cell flash memory having a small margin between cell distributions.

If a bit error rate is greater than a predetermined value, the memory controller 110 performs a read reclaim operation to preserve data stored in the nonvolatile memory device. However, the read reclaim operation increases the number of an erase or write operation, thereby shortening the lifetime of the nonvolatile memory device 120.

Figure 9:
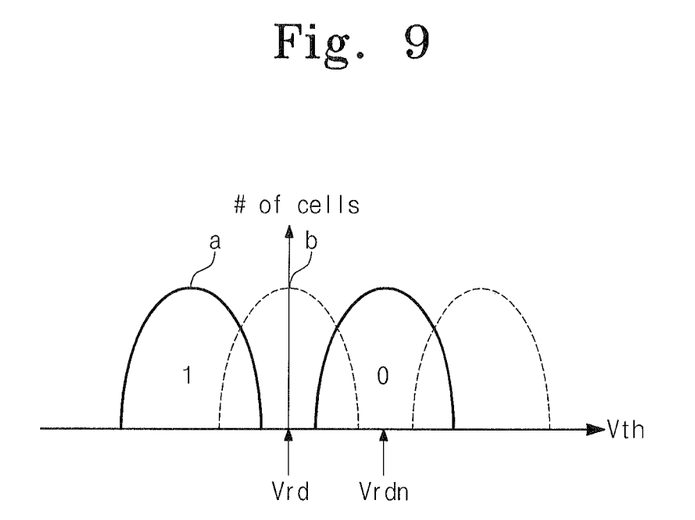
FIG. 9 is a distribution illustrating a change of the cell distribution of FIG. 7.

FIG. 9 illustrates a change of the cell distribution of FIG. 7.

Referring to FIG. 9, there is illustrated a cell distribution of the case that the number of times that a program or erase operation is repeatedly performed on memory cells is greater than that of FIG. 7. The cell distribution is shifted to the extent that cells having a logic state "1" have a distribution with a peak at about the read voltage Vrd.

Referring to FIG. 9, If the memory controller 110 reads data using a read voltage Vrd, a bit error rate is greater than the shifted cell distribution of FIG. 7. If a bit error rate is greater than a predetermined value, the nonvolatile memory device 120 adjusts the read voltage Vrd using a read retry operation. In an exemplary embodiment, the predetermined value of a bit error rate may have a bit error rate as determined as a read fail. Using the read retry operation, the read voltage Vrd is changed to a new read voltage Vrdn having a voltage between the highest threshold voltage of shifted cells having a logic state "1" and the lowest threshold voltage of shifted cells having a logic state "0". The bit error rate is reduced when a read operation is performed using the read voltage Vrdn.

However, although the nonvolatile memory device 120 reduces a bit error rate by adjusting the read voltage, despite a situation that a program or erase operation is repeated more frequently and a cell distribution is not good as compared with FIG. 7, a read reclaim operation of the nonvolatile memory device 120 may not be performed. That is, despite a situation that the case of FIG. 9 has more need of performance of a read reclaim operation than the case of FIG. 7, a case that a read reclaim operation is performed in the case of FIG. 7 may occur.

Figure 10:
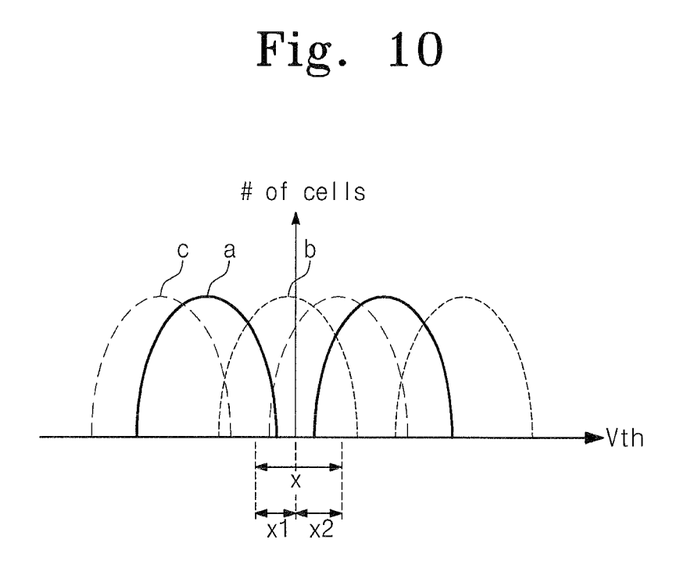
FIGS. 10 through 12 are threshold voltage distributions of memory cells illustrating an operation of the memory controller of FIG. 1.
Figure 11:
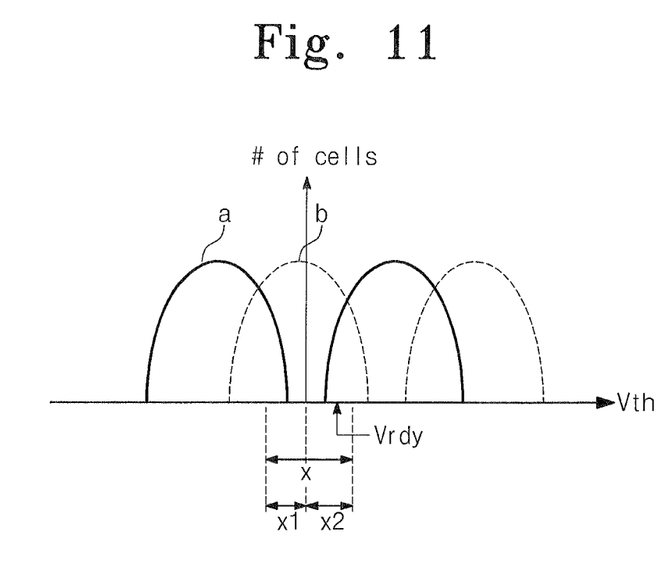
Figure 12:
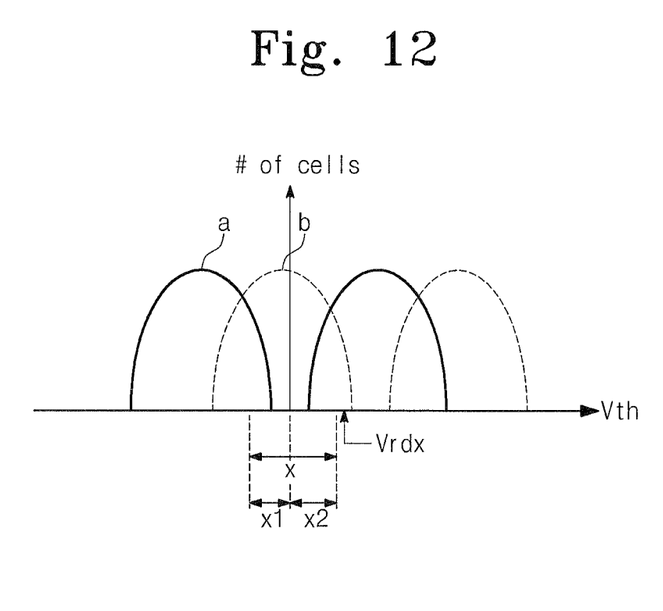

FIGS. 10 through 12 are threshold voltage distributions of memory cells for illustrating an operation of the memory controller of FIG. 1. For simplicity of description, a single level cell is described, but the inventive concept may extend to a multi level cell.

Referring to FIG. 10, a reclaim prohibition range X is illustrated. The reclaim region X includes a first range x1 and a second range x2. The first range x1 and the second range x2 are defined to have a predetermined range on the basis of a read voltage Vrd. The first range x1 has voltages lower than the read voltage Vrd. The second range x2 has voltages higher than the read voltage Vrd. Voltage ranges of the first range x1 and the second range x2 may be asymmetric with respect to the read voltage Vrd. Considering charge losses that occur due to the passage of time, the first range x1 may have a range smaller than that of the second range x2.

Referring to FIG. 11, if a read voltage is within the reclaim prohibition range X, such as Vrd or Vrdy, the reclaim control unit 112 does not perform a read reclaim operation on the memory cells. In particular, if the read voltage is Vrdy, the memory controller does not perform a read reclaim operation on the memory cells even when the bit error rate of the memory cells is greater than the predetermined threshold. If a read voltage is within the reclaim prohibition range X, the reclaim control unit 112 does not perform a read reclaim operation on the nonvolatile memory even when a bit error rate is greater than a threshold value.

Referring to FIG. 12, if the read voltage is not within the reclaim prohibition range X, such as Vrdx, the reclaim control unit 112 performs a read reclaim operation on the memory cells.

As described above, the operation method of the memory controller in accordance with an exemplary embodiment of the inventive concept controls the nonvolatile memory device 120 to perform a read reclaim operation only when a read voltage is not within the prohibition range X. Thus, the number of times that the read reclaim operation of the nonvolatile memory device 120 is performed is reduced thereby improving the lifetime of the nonvolatile memory device 120.

Figure 13:
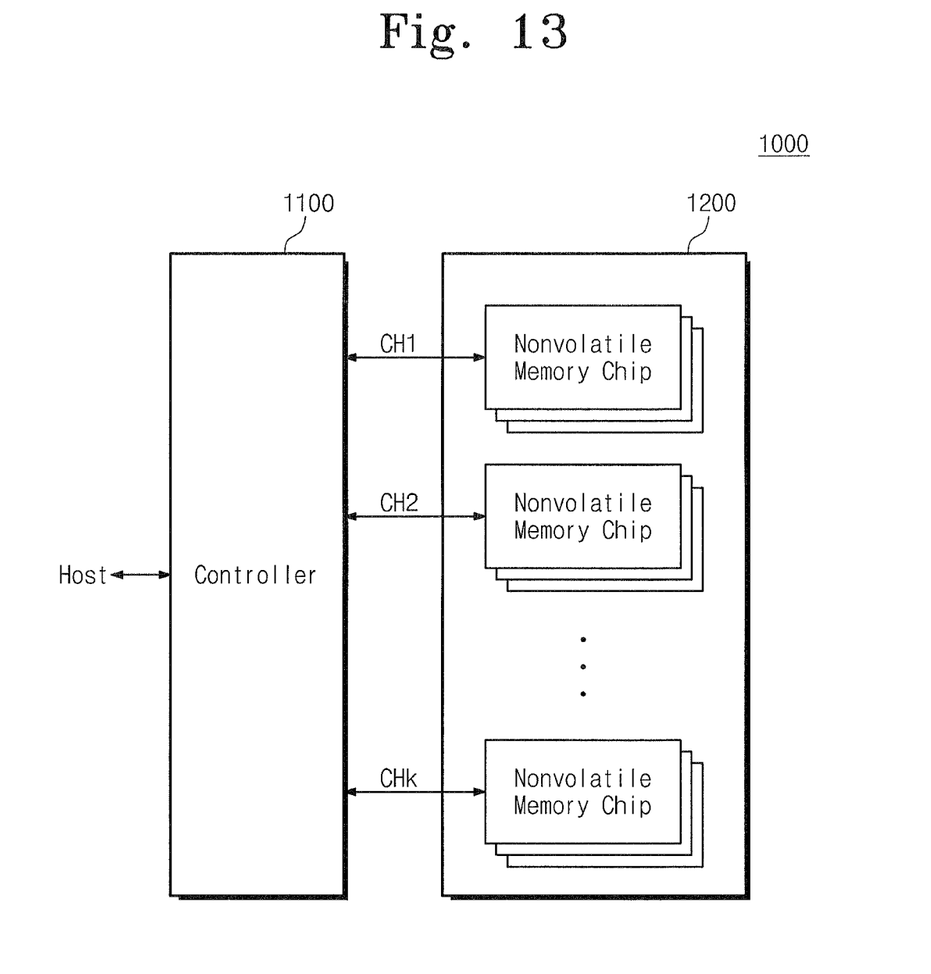
FIG. 13 is a block diagram of a memory system in accordance with an exemplary embodiment of the inventive concept.

FIG. 13 is a block diagram of a memory system in accordance with an exemplary embodiment of the inventive concept.

Referring to FIG. 13, a memory system 1000 includes a controller 1100 and a nonvolatile memory device 1200. The nonvolatile memory device 1200 includes a plurality of nonvolatile memory chips. The plurality of nonvolatile memory chips is divided into a plurality of groups. Each group of the plurality of nonvolatile memory chips is configured to communicate with the controller 1100 through one common channel.

In FIG. 13, the plurality of nonvolatile memory chips communicates with the controller 1100 through a first through a kth channels (CH1~CHk). Each nonvolatile memory chip is constituted like the nonvolatile memory device 120 described with reference to FIG. 2. The controller 1100 may be constituted like the memory controller 1100 described with reference to FIG. 1.

The controller 1100 and the nonvolatile memory device 1200 may be integrated into a single semiconductor device to constitute a memory card such as a PC card (PCMCIA, personal computer memory card international association), a compact flash (CF) card, a smart media card (SM, SMC), a memory stick, a multimedia card (MMC, RS-MMC, MMC-micro), a SD card (SD, miniSD, micro SD, SDHC), or a universal flash memory device (UFS).

The controller 1100 and the nonvolatile memory device 1200 may be packaged using various package types including PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) or wafer-level processed stack package (WSP).

Figure 14:
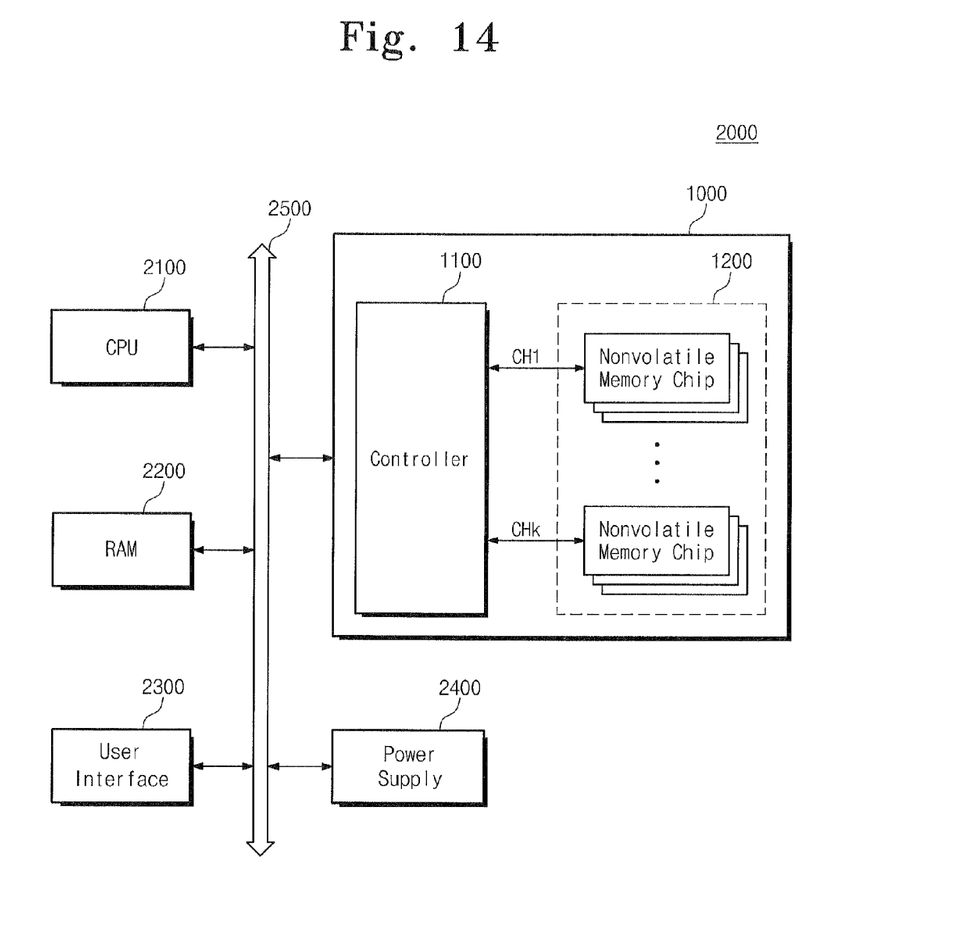
FIG. 14 is a computing system including the memory system of FIG. 13.

FIG. 14 is a computing system including the memory system of FIG. 13.

Referring to FIG. 14, the computing system 2000 includes a central processing unit 2100, a RAM 2200, a user interface 2300, a power supply 2400 and a memory system 1000.

The central processing unit 2100 controls constituent elements of the computing system 2000, executes an operating system and various programs and performs a logical operation.

The RAM 2200 may be an operation memory of the computing system 2000. The RAM 2200 may include a dynamic random access memory (DRAM) device, a static random access memory (SRAM) device, a phase change random access memory (PRAM) device, a magnetoresistive random access memory (MRAM) device, a resistive random access memory (RRAM) device, a ferroelectric random access memory (FRAM), etc.

The user interface 2300 exchanges a signal with a user. The user interface 2300 may include user input interfaces such as a camera, a mike, a keyboard, a mouse, a touch pad, a touch panel, a touch screen, a button, a switch, etc. The user interface 2300 may include a user output interfaces such as a display device, a speaker, a ramp, a motor, etc. The display device may include an LCD, an AMLED display device, a beam projector, etc.

The power supply 2400 supplies an operation power to the computing system 2000. If the computing system 2000 is embodied for the purpose of a mobile device, the power supply 2400 may be constituted in the form of battery (not shown).

The memory system 1000 is electrically connected to the central processing unit 2100, the RAM 2200, the user interface 2300 and the power supply 2400 through a system bus 2500. Data provided through the user interface 2300 or processed by the central processing unit 2100 is stored in the memory system 1000. The memory system 1000 may be constituted as described with reference to FIG. 1 or 13. The computing system 2000 may be constituted to include the memory systems 100 and 1000 described with reference to FIGS. 1 and 14.

A memory controller, a method of operating the same and a memory system including the same in accordance with an exemplary embodiment of the inventive concept improves the lifetime of a nonvolatile memory device.

A memory controller, a method of operating the same and a memory system including the same in accordance with an exemplary embodiment of the inventive concept controls a read reclaim operation of a nonvolatile memory device. While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A memory controller controlling a nonvolatile memory device having a plurality of memory blocks as a data storage space comprising:
   an error detection and correction circuit configured to receive data from one of the plurality of the memory blocks and calculate a comparison result by comparing a bit error rate of the received data and a predetermined value; and
   a reclaim control unit configured to determine whether or not to perform a read reclaim operation depending on the comparison result and a read voltage used to read the data,
   wherein the read reclaim operation copies the data to a memory block different from a memory block having stored the data,
   wherein if the bit error rate is greater than the predetermined value and the read voltage is out of a reclaim prohibition range, the reclaim control unit performs the read reclaim operation.

2. The memory controller of claim 1,
   wherein if the bit error rate is smaller than the predetermined value, the reclaim control unit does not perform the read reclaim operation.

3. The memory controller of claim 1,
   wherein the reclaim prohibition range comprises:
      a first range having voltages lower than the read voltage; and
      a second range having voltages higher than the read voltage.

4. The memory controller of claim 3,
   wherein the first range and the second range are asymmetric with respect to the read voltage.

5. The memory controller of claim 4,
   wherein the first range is greater than the second range.

6. An operation method of a memory controller controlling a nonvolatile memory device having a plurality of memory blocks comprising:
   (a) performing a read operation on one of the plurality of the memory blocks using a first read voltage;
   (b) receiving data from the nonvolatile memory device;
   (c) determining whether a bit error rate of the data is less than a predetermined value;
   (d) if the bit error rate is determined as not being less than the predetermined value, determining whether the first read voltage is within a reclaim prohibition range; and
   (e) depending on a result of the step (d), determining whether or not performing a read reclaim operation of copying the data to a memory block different from the memory block having stored the data.

7. The operation method of a memory controller of claim 6,
   wherein if the first read voltage is determined as not being within the reclaim prohibition range, the read reclaim operation is performed in the step (e).

8. The operation method of a memory controller of claim 7,
   wherein if the first read voltage is determined as being within the reclaim prohibition range, the read reclaim operation is not performed in the step (e).

9. The operation method of a memory controller of claim 8,
   wherein the reclaim prohibition range comprises:
      a first range having voltages lower than the first read voltage; and
      a second range having voltages higher than the first read voltage.

10. The operation method of a memory controller of claim 9,
    wherein voltage ranges of the first range and the second range are asymmetric with respect to the first read voltage.

11. The operation method of a memory controller of claim 10,
    wherein the first range is greater than the second range.

12. The operation method of a memory controller of claim 7,
    wherein if the bit error rate is determined as greater than the predetermined value, a read retry operation is performed to adjust the first read voltage to a second read voltage.

13. The operation method of a memory controller of claim 12,
    wherein the steps from step (a) to step (e) is performed using the second read voltage instead of the first read voltage.

14. The operation method of a memory controller of claim 13,
    wherein the reclaim prohibition range comprises:
       a first range having voltages lower than the first read voltage; and
       a second range having voltages higher than the first read voltage.

15. The operation method of a memory controller of claim 14,
    wherein voltage ranges of the first range and the second range are asymmetric with respect to the first read voltage.

16. A memory system comprising:
    a nonvolatile memory device comprising a plurality of memory blocks as a data storage space; and
    a memory controller configured to:
       perform a read operation using a read voltage on one of the plurality of the memory blocks,
       calculate a bit error rate of data received from nonvolatile memory device,
       calculate a comparison result by comparing the bit error rate and a predetermined value, wherein the predetermined value is equal to or less than a number of errors to be corrected by the memory controller using an error correction algorithm, and
       determine whether or not to perform a read reclaim operation based on the read voltage and the comparison result,
    wherein the read reclaim operation copies the data to a memory block different from a memory block having stored the data depending on the read voltage, and wherein the memory controller is further configured not to perform the read reclaim operation if the bit error rate is not less than the predetermined value and the read voltage is not within a read reclaim prohibition range.

17. The memory system of claim 16, wherein the read reclaim prohibition range comprises a first range having voltages lower than an initial read voltage and a second range having voltages higher than the initial read voltage.

18. The memory system of claim 17, wherein voltage ranges of the first range and the second range are asymmetric with respect to the first read voltage.

19. The memory system of claim 17, wherein the memory controller is further configured to adjust the read voltage to another read voltage if the bit error rate is greater than a predetermined value and perform a read operation using the adjusted read voltage.

* * * * *